United States Patent Office 2,864,679
Patented Dec. 16, 1958

2,864,679

SELECTIVE METHOD OF INHIBITING PRE-EMERGENT GROWTH OF GRASSES

Philip C. Hamm, Webster Groves, and Angelo J. Speziale, Kirkwood, Mo., assignors to Monsanto Chemical Company, St. Louis, Mo., a corporation of Delaware No Drawing. Application September 13, 1954
Serial No. 455,736

12 Claims. (Cl. 71—2.3)

This invention relates to herbicidal compounds and methods for their use. More particularly, this invention relates to methods of inhibiting the growth of grasses in the presence of other vegetation.

Many chemical compounds are known to be deleterious to the growth of vegetation and to have herbicidal effects under specific conditions, some of which are known to be quite effective at low levels of application. It is, however, a more difficult problem to provide useful herbicides for selective activity on undesirable plants, but which are harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to contact herbicides.

It is the primary purpose of this invention to provide a new and useful class of herbicides. A further purpose of the invention is to provide methods of destroying grasses in the presence of broad leaf plants. A still further purpose is to provide a novel selective pre-emergence herbicide procedure. Other purposes of the invention will be apparent from the following specification.

In accordance with this invention it has been discovered that compounds of the following chemical structure have unusual and valuable herbicidal activity

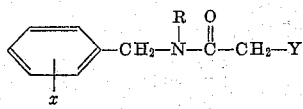

wherein Y is a halogen atom, including chlorine, bromine, iodine and fluorine, wherein $x$ is a hydrogen atom, a halogen atom, a nitro radical, or an alkyl radical having up to four carbon atoms, including methyl, ethyl, propyl and isopropyl, and wherein R is selected from the group consisting of hydrogen, alkyl radicals having up to six carbon atoms, alkenyl radicals having up to six carbon atoms, alkynyl radicals having up to six carbon atoms, halo-substituted alkyl radicals having up to six carbon atoms, halo-substituted alkenyl radicals having up to six carbon atoms, halo-substituted alkynyl radicals having up to six carbon atoms, and oxa-alkyl radicals having up to six carbon atoms.

Suitable compounds for use in the practice of this invention are the α-haloacetamides, including the α-chloroacetamide, α-bromoacetamide, α-iodoacetamide, and the α-fluoroacetamide, wherein one of the substituents on the nitrogen is a benzyl or substituted benzyl radical and the other substituent is a radical selected from the group consisting of alkyl radicals such as methyl, ethyl, propyl, isopropyl, n-butyl, primary isobutyl, secondary isobutyl, tertiary butyl, n-amyl, any of the branch chain amyls and any of the hexyl radicals; the alkenyl, including vinyl, allyl, crotyl, methallyl and methyl vinyl radicals; the alkynyl radicals, including propargyl, the haloalkyl radicals, such as 2-chloroethyl, 2-chloropropyl, 3-chloropropyl, chloromethyl and 2-bromopropyl radicals; the halo-alkenyl radicals such as 2-chloroallyl, 3-chlorocrotyl, 3-chloroallyl, 2,3-dichloroallyl, 3-chloro-2-butenyl, 3-bromoallyl and 2-iodoallyl; the halo-alkynyl radicals such as 2-chloropropargyl, 3-bromopropargyl and 4-chloromethyl propargyl; and the oxa-aliphatic radicals such as 2-methoxyethyl, 2-ethoxyethyl, 3-methoxypropyl, 3-butoxypropyl and 2-ethoxyethoxyethyl.

The new chemical compounds may be prepared by the reaction of benzyl amine, or any of the alkyl or halogen substituted primary benzyl amines or the secondary amines having a benzyl or substituted benzyl substituent and an aliphatic substituent, with α-haloacetyl chloride. These reactions are preferably conducted at reduced temperatures and in the presence of aqueous sodium hydroxide. If desired, the reaction may be conducted in the presence of a suitable solvent, for example ethylene dichloride, which facilitates temperature control during the reaction and enables the ready separation of the product from the reaction mass. The product is separated with the solvent from the aqueous phase and recovered by crystallization or distillation. Purification of the product may be effected by recrystallization from the same or other solvent.

Further details for the preparation are set forth with respect to the following example.

*Example*

A mixture of 21.4 g. of benzylamine, 100 ml. of ethylene dichloride and 60 g. of 20 percent sodium hydroxide was charged to a 500 ml. flask and cooled to −10° C. while maintaining the temperature between −5° C. and −10° C. over a two hour period 33.8 g. of chloroacetyl chloride was gradually added. The mixture was stirred for one-half hour while the temperature rose to 10° C. 200 ml. of additional ethylene dichloride was added to dissolve the solid material formed. The solvent layer was separated, washed with water and evaporated to dryness. The white crystalline, as recrystallized from methanol, was identified as α-chloro-N-benzylacetamide.

The relative value of each of the chloroacetamides was determined by planting in greenhouse flats seeds of eight different plants each representing a principal botanical type. The flats were treated with the various herbicides and the observations are set forth below with respect to several typical botanical specimens each representing a principal type of plant.

A _____ Wild oat.
B _____ Cheat grass.
C _____ Rye.
D _____ Buckwheat.
E _____ Mustard.
F _____ Beet.
G _____ Cotton.
H _____ Cucumber.

The relative value of each compound with respect to its herbicidal effect on the various plants is indicated by a number as follows:

0 _____ No phytotoxicity.
1 _____ Slight phytotoxicity.
2 _____ Moderate phytotoxicity.
3 _____ Severe phytotoxicity.

The N-benzyl α-chloroacetamide was evaluated at the rate of 5 lbs. per acre and was found to be effective against all grasses and was found to have little or no effect on several types of broad leaf plants.

| | A | B | C | D | E | F | G | H |
|---|---|---|---|---|---|---|---|---|
| N-benzyl α-chloroacetamide | 2 | 3 | 2 | 0 | 0 | 2 | 1 | 3 |

In order to demonstrate the different effects of closely related compounds, the identical tests were performed on N-phenyl a-chloroacetamide and N-phenethyl a-chloroacetamide. It will be noticed that little effect is obtained on grasses and that herbicidal activity with respect to broad leaf plants is inconsistent.

|  | A | B | C | D | E | F | G | H |
|---|---|---|---|---|---|---|---|---|
| N-phenyl α-chloroacetamide | 0 | 2 | 0 | 0 | 0 | 3 | 0 | 2 |
| N-phenethyl α-chloroacetamide | 0 | 0 | 0 | 0 | 0 | 0 | 0 | 1 |

Similar screening tests were applied to N-N-dibenzyl a-chloroacetamide. At 25 lbs. per acre very litle herbicidal effect was observed, the ratings being as follows:

|  | A | B | C | D | E | F | G | H |
|---|---|---|---|---|---|---|---|---|
| N-N-dibenzyl α-chloroacetamide | 0 | 0 | 1 | 0 | 0 | 1 | 0 | 0 |

It is apparent from the above experimental data that the structure of an a-halo N-benzylacetamide is critical to be of utility as a herbicide. In the preparation and examination of herbicidal properties of over 200 different compounds it has been learned that N-substitute propionamides and N-substituted butyramides have little or no herbicidal activity. Similarly, the presence of a second halogen atom on the alpha carbon atom will destroy the activity. Anologues prepared with bromine and iodine as the alpha halogen have been shown to have better contact herbicidal activity but slightly lower pre-emergence herbicidal effect. Although it has been shown that a second benzyl group will destroy activity, a short aliphatic group will not diminish the compounds utility as a herbicide.

Valuable herbicidal effects will be observed by applications of small amounts, for example as low as 1 lb. of active component per acre as well as high concentrations, for example 100 lbs. per acre. The selective activity on grasses is exhibited at lower rates of application, for example from 2 to 15 lbs per acre. For general application and herbicidal effect on both the grasses and the dicotyledonous plants, it will be found necessary to use from 10 to 50 lbs. per acre.

Selective herbicidal activity with respect to several genera of grasses is illustrated by the data in the above tables. Other experiments run with respect to plants of different genera, which have different metabolisms and physical characteristics indicate little or no inhibition of growth. The three botanical types, or genera, of grasses which are effectively controlled by means of the a-haloacetamides of this invention, embrace a large number of undesirable plants, or weeds, frequently found in vegetable crops. This invention is not limited to removing grasses from broad leaf plants, since the selective activity will be useful in removing weeds from corn, which belongs to a different genus of grass. Many other crops and particularly the broad leaved plants are inhibited by weeds of the wild oat, cheat and rye genera, which can be effectively controlled by the practice of this invention. In some instances there are minor herbicidal effects on dicotyledonous plants, and therefore optimum results may depend to some extent on experience with respect to the activity of the particular N-substituted a-haloacetamide on the vegetable crop to be treated.

As demonstrated above, unusual grass specificity can be achieved at lower levels of application, whereas at higher levels of application the N-substituted a-haloacetamides exhibit a more general herbicidal effect. This provides another and quite different utility in the removal of plants of a large number on all botanical genera. It will be apparent that quite different effects can be obtained by modifying the method of use. For this reason an essential part of this invention is the formulation so as to permit a uniform predetermined application of herbicide to the plant environment, for example to leaves or soil surfaces, so as to produce the desired effect. By the proper selection and proportioning of the various conditioning agents either liquid or solid formulations can prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted α-haloacetamides may be water-soluble and mere dissolution will then provide a useable formulation. Often the N-substituted α-haloacetamides are only limitedly soluble in water and therefore aqueous formulations will necessarily be dispersions of minute drops of the water-insoluble substances in suspension in an aqueous medium. The known water-insoluble substituted α-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

This application is a continuation-in-part of our application Serial No. 389,492 filed October 30, 1953 and now abandoned.

What is claimed is:

1. The method of preemergently inhibiting the germination of seeds in contact with soil which comprises treating the said soil with a herbicidal amount of N-allyl-N-benzyl alpha-chloroacetamide.

2. The method of selectively inhibiting the germination of grass seeds and the preemergence growth thereof in the presence of growing crops, which comprises treating the soil medium with a herbicidal amount of a compound of the structure:

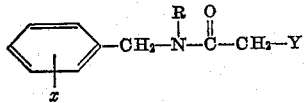

wherein Y is a halogen atom, wherein x is a radical selected from the group consisting of a hydrogen atom, a halogen atom, a nitro radical and an alkyl radical having up to four carbon atoms, and wherein R is selected from the group consisting of hydrogen, alkyl radicals having up to six carbon atoms, alkenyl radicals having up to six carbon atoms, alkynyl radicals having up to six carbon atoms halo-substituted alkyl radicals having up to six carbon atoms, halo-substituted alkenyl radicals having up to six carbon atoms, and halo-substituted alkynyl radicals having up to six carbon atoms.

3. The method of selectively inhibiting the germination and preemergent growth of grasses from seeds in contact with soil, which comprises treating the said soil with a herbicidal amount consisting of from one to 15 pounds per acre of a compound having the structure:

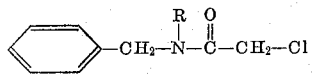

wherein R is an aliphatic hydrocarbon radical having up to six carbon atoms.

4. The method defined by claim 2 wherein the herbicidal compound is N-benzyl alpha-chloroacetamide.

5. The method defined by claim 2 wherein the herbicidal compound is N-chlorobenzyl alpha-chloroacetamide.

6. The method defined by claim 2 wherein the herbicidal compound is N-benzyl N-ethyl alpha-chloroacetamide.

7. The method defined by claim 2 wherein the herbicidal compound is N-benzyl-N-methyl alpha-chloroacetamide.

8. The method defined by claim 3 wherein the herbicidal compound is N-benzyl alpha-chloroacetamide.

9. The method defined by claim 3 wherein the herbicidal compound is N-chlorobenzyl alpha-chloroacetamide.

10. The method defined by claim 3 wherein the herbicidal compound is N-benzyl N-ethyl alpha-chloroacetamide.

11. The method defined by claim 3 wherein the herbicidal compound is N-allyl-N-benzyl alpha-chloroacetamide.

12. The method defined by claim 3 wherein the herbicidal compound is N-benzyl-N-methyl alpha-chloroacetamide.

References Cited in the file of this patent
UNITED STATES PATENTS

| | | |
|---|---|---|
| 2,256,186 | Balle et al. | Sept. 16, 1941 |
| 2,409,315 | Rigby et al. | Oct. 15, 1946 |
| 2,622,975 | Zimmerman et al. | Dec. 23, 1952 |
| 2,622,976 | Hitchcock et al. | Dec. 23, 1952 |
| 2,636,816 | Stewart | Apr. 28, 1953 |
| 2,649,363 | Swezey | Aug. 18, 1953 |